(12) United States Patent
Bragstad et al.

(10) Patent No.: US 9,471,432 B2
(45) Date of Patent: *Oct. 18, 2016

(54) BUFFERED CLONED OPERATORS IN A STREAMING APPLICATION

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/529,117

(22) Filed: Oct. 30, 2014

(65) Prior Publication Data

US 2016/0103737 A1    Apr. 14, 2016

Related U.S. Application Data

(63) Continuation of application No. 14/511,308, filed on Oct. 10, 2014.

(51) Int. Cl.
| | |
|---|---|
| *G06F 11/00* | (2006.01) |
| *G06F 11/14* | (2006.01) |
| *H04L 29/06* | (2006.01) |
| *G06F 9/44* | (2006.01) |

(52) U.S. Cl.
CPC ............ *G06F 11/1415* (2013.01); *G06F 9/44* (2013.01); *G06F 11/1471* (2013.01); *H04L 65/605* (2013.01); *G06F 2201/805* (2013.01)

(58) Field of Classification Search
CPC ........... G06F 11/1415; G06F 11/1471; G06F 11/1484; G06F 9/44
See application file for complete search history.

(56) References Cited

U.S. PATENT DOCUMENTS

| | | | |
|---|---|---|---|
| 8,694,828 B2 | 4/2014 | Nelson et al. | |
| 8,726,242 B2 | 5/2014 | Ngo | |
| 8,732,300 B2* | 5/2014 | Barsness | G06F 17/30516 709/223 |
| 2004/0034807 A1* | 2/2004 | Rostowfske | G06F 11/2038 714/4.1 |
| 2006/0230174 A1 | 10/2006 | Hoche et al. | |
| 2013/0151477 A1 | 6/2013 | Tsaur et al. | |
| 2016/0103737 A1* | 4/2016 | Bragstad | G06F 11/1415 714/15 |
| 2016/0103742 A1* | 4/2016 | Bragstad | G06F 11/1415 714/19 |

OTHER PUBLICATIONS

Kwon et al., "Fault-tolerant stream processing using a distributed, replicated file system," VLDB-08, Aug. 24-30, 2008.*

(Continued)

*Primary Examiner* — Philip Guyton
(74) *Attorney, Agent, or Firm* — Martin & Associates, LLC; Derek P. Martin

(57) ABSTRACT

A streams manager clones a portion of a primary flow graph to a virtual machine with a buffer to assure no data is lost if the corresponding portion of the primary flow graph fails. The buffer can be on the input of the cloned portion or on the output of the cloned portion. Cloning a portion of a primary flow graph with a buffer assures no data is lost when the corresponding portion of the primary flow graph fails. When the primary flow graph recovers from the failure, the processing may be switched back to the primary flow graph, which causes the buffer to begin buffering once again.

9 Claims, 9 Drawing Sheets

(56) References Cited

OTHER PUBLICATIONS

Bragstad et al., "Buffered Cloned Operators in a Streaming Application" U.S. Appl. No. 14/511,308, filed Oct. 10, 2014.
List of IBM Patents or Patent Applications Treated as Related.
Zaharia et al., "Discretized Streams: A Fault-Tolerant Model for Scalable Stream Processing," Electrical Engineering and Computer Sciences, University of California at Berkeley, Technical Report No. UCB/EECS-2012-259, Dec. 14, 2012.
Zaharia et al., "Discretized Streams: An Efficient and Fault-Tolerant Model for Stream Processing on Large Clusters," Abstract of video presentation, 2012 USENIX Federated Conferences Week, Jun. 12-15, 2012.

* cited by examiner

BUFFERED CLONED OPERATORS IN A STREAMING APPLICATION

BACKGROUND

1. Technical Field

This disclosure generally relates to streaming applications, and more specifically relates to cloning one or more operators in a streaming application to a virtual machine, and providing a buffer in the virtual machine to assure no data loss occurs when a failure occurs in the streaming application.

2. Background Art

Streaming applications are known in the art, and typically include multiple operators coupled together in a flow graph that process streaming data in near real-time. An operator typically takes in streaming data in the form of data tuples, operates on the data tuples in some fashion, and outputs the processed data tuples to the next operator. Streaming applications are becoming more common due to the high performance that can be achieved from near real-time processing of streaming data.

Some parts of a streaming application may be more critical than others. When a critical portion of a streaming application fails, data loss results, which is unacceptable in many applications.

BRIEF SUMMARY

A streams manager clones a portion of a primary flow graph to a virtual machine with a buffer to assure no data is lost if the corresponding portion of the primary flow graph fails. The buffer can be on the input of the cloned portion or on the output of the cloned portion. Cloning a portion of a primary flow graph with a buffer assures no data is lost when the corresponding portion of the primary flow graph fails. When the primary flow graph recovers from the failure, the processing may be switched back to the primary flow graph, which causes the buffer to begin buffering once again.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
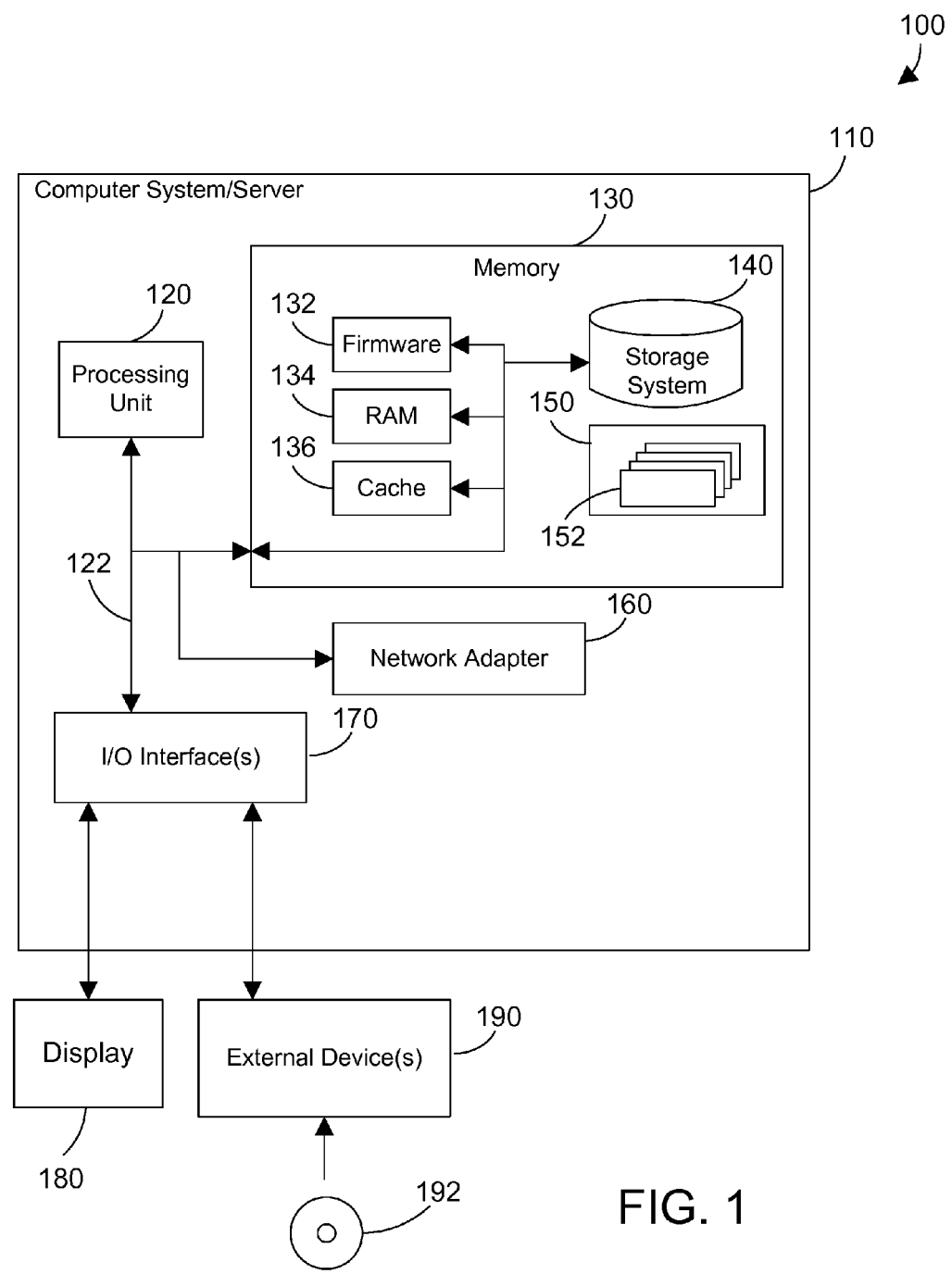
FIG. 1 is a block diagram of a cloud computing node.

The disclosure and claims herein relate to a streams manager that clones a portion of a primary flow graph to a virtual machine with a buffer to assure no data is lost if the corresponding portion of the primary flow graph fails. The buffer can be on the input of the cloned portion or on the output of the cloned portion. Cloning a portion of a primary flow graph with a buffer assures no data is lost when the corresponding portion of the primary flow graph fails. When the primary flow graph recovers from the failure, the processing may be switched back to the primary flow graph, which causes the buffer to begin buffering once again.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
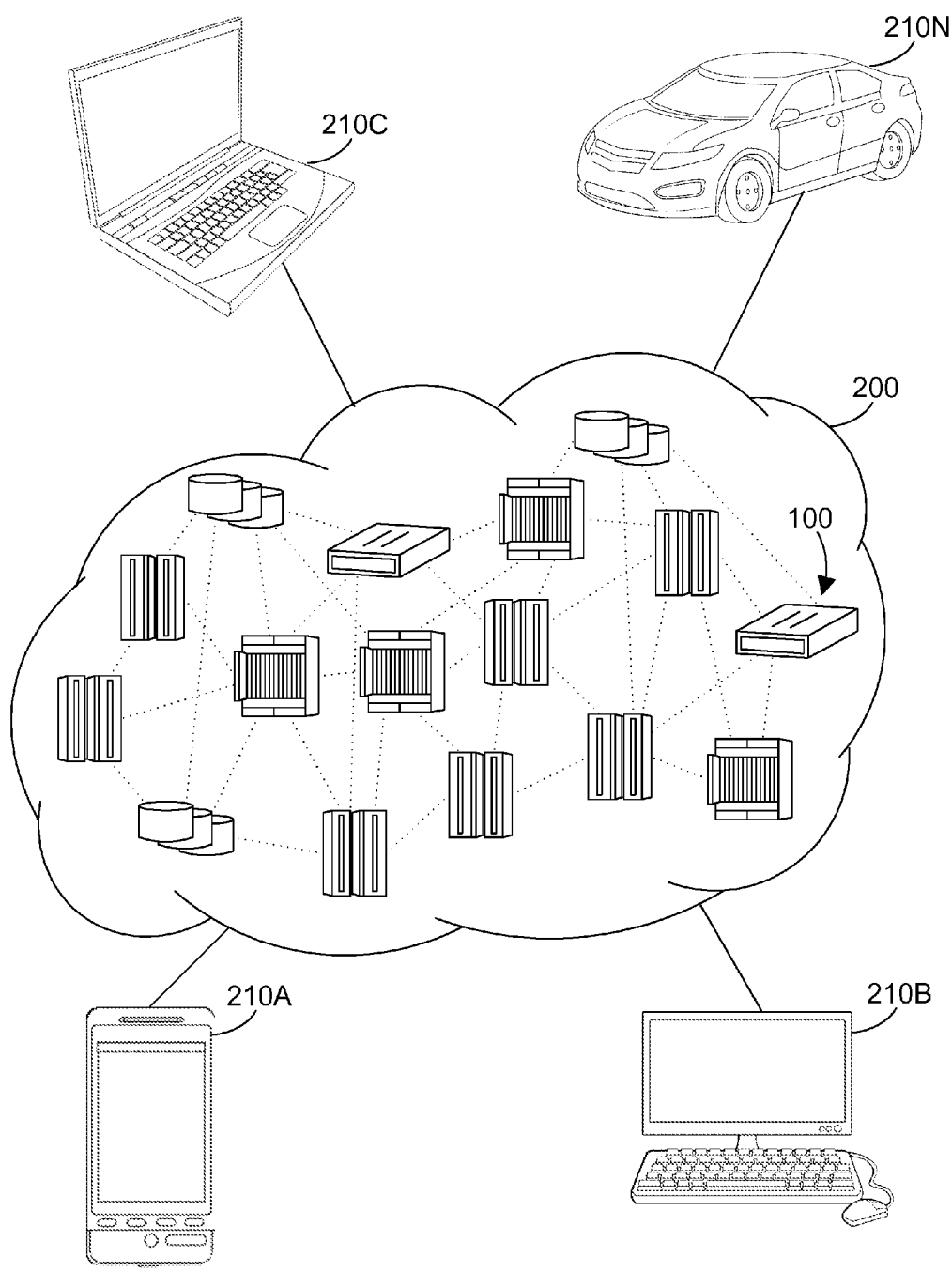
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
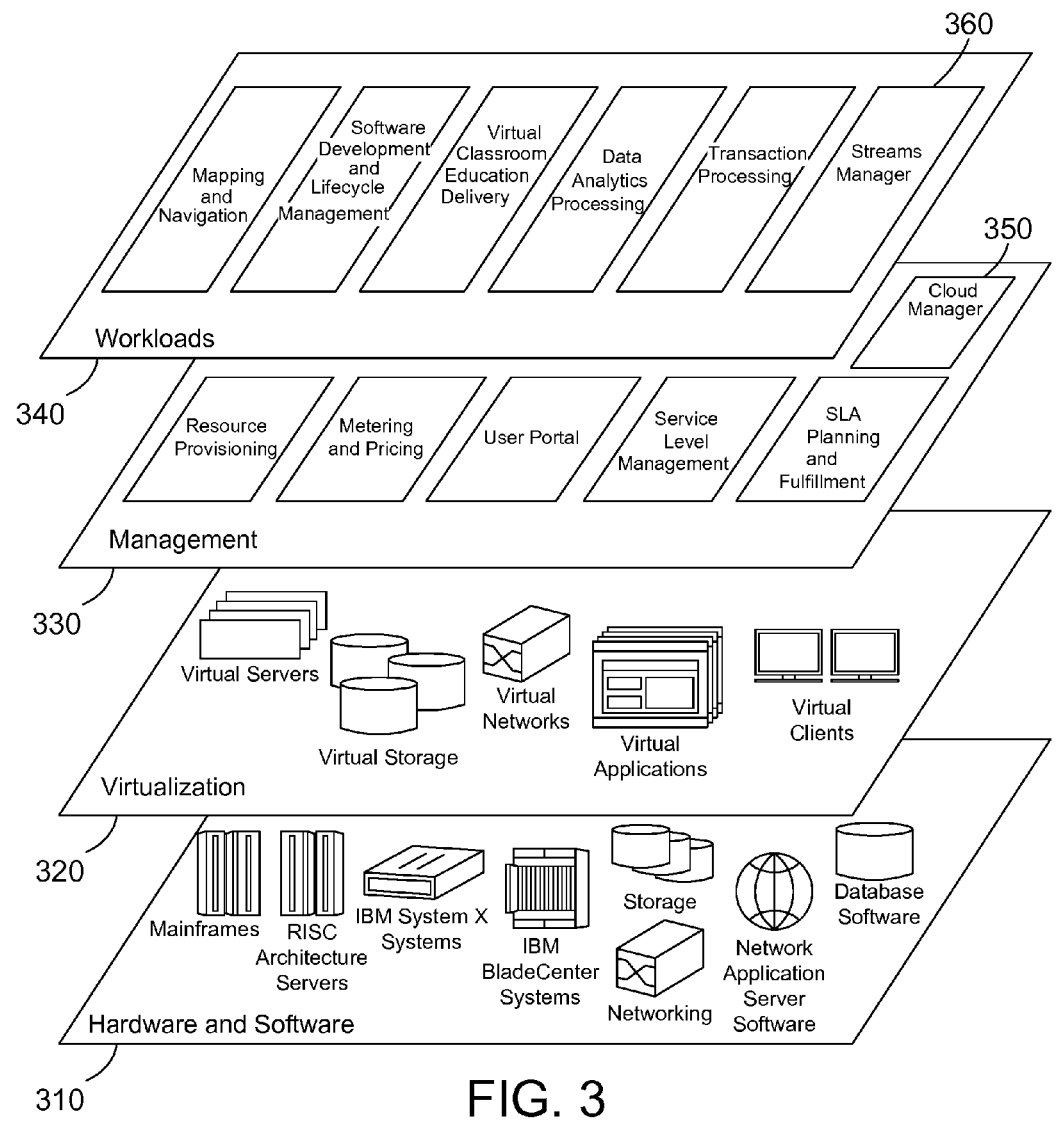
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
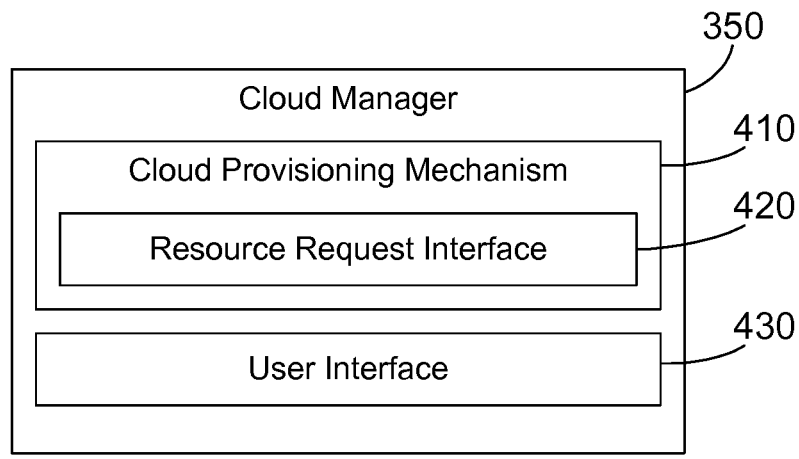
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request without human intervention virtual machines from the cloud manager 350. The cloud manager 350 also includes a user interface 430 that allows a user to interact with the cloud manager to perform any suitable function, including provisioning of VMs, destruction (tearing down) of VMs, performance analysis of the cloud, signaling a VM, etc. The difference between the resource request interface 420 and the user interface 430 is a user must manually use the user interface 430 to perform functions specified by the user, while the resource request interface 420 may be used by a software entity to request provisioning or destruction of cloud resources by the cloud mechanism 350 without input from a human user. Of course, cloud manager 350 could include many other features and functions known in the art that are not shown in FIG. 4.

Figure 5:
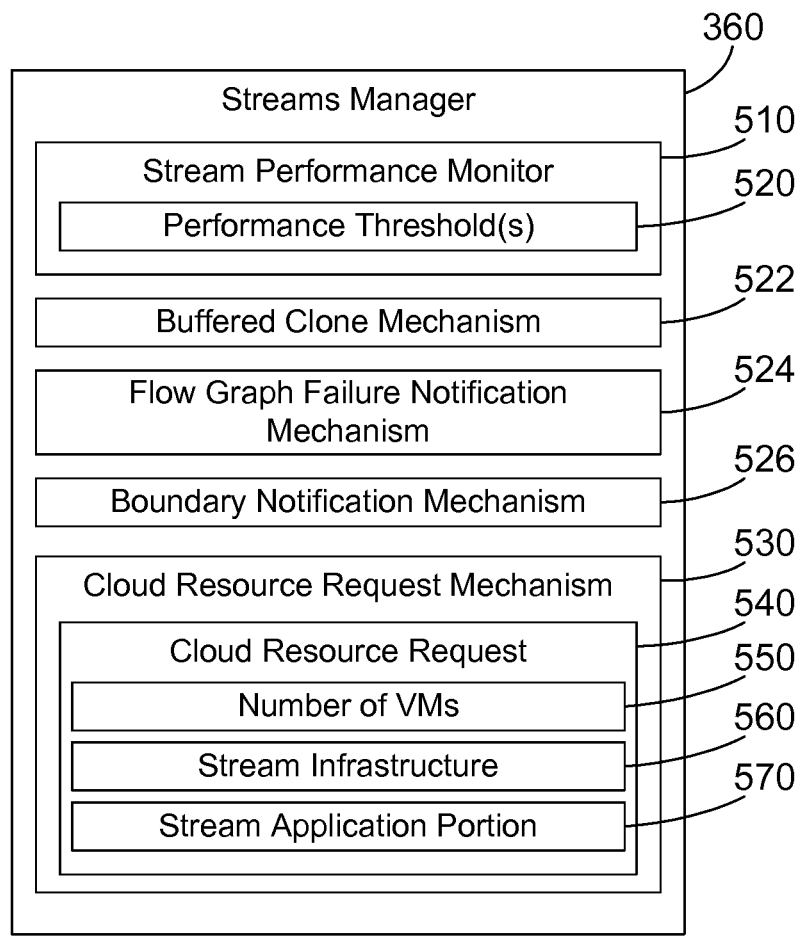
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. The performance monitor 510 can also determine when a portion of a flow graph cannot tolerate data loss, and therefore needs to be cloned to a VM. The performance monitor 510 can also detect when one or more operators in the flow graph fail.

The stream performance monitor 510 monitors performance of a streaming application, and when a portion of the streaming application is identified for which data loss needs to be prevented, the stream performance monitor 510 may communicate the need for resources to the cloud resource request mechanism 530 so a portion of the streaming application may be cloned to a virtual machine. The cloud resource request mechanism 530, in response to the communication from the stream performance monitor, assembles a cloud resource request 530, which can include information such as a number of VMs to provision 550, stream infrastructure needed in each VM 560, and a stream application portion 570 for each VM. Once the cloud resource request 530 is formulated, the streams manager 360 submits the cloud resource request 530 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

The streams manager 360 includes a buffered clone mechanism 522. When a primary flow graph includes a first portion for which data loss needs to be prevented, the streams manager 360 creates a cloned portion of the flow graph. Note the determination of the first portion of the primary flow graph for which data loss needs to be prevented can be done by the stream performance monitor 510 monitoring performance of the streaming application, or may be specified by a user. One suitable way to create the cloned portion of the flow graph is to make a request via the resource request interface 420 of the cloud provisioning mechanism 410 to create a VM with the cloned portion of the flow graph. In response, the cloud manager 350 will create the cloned portion of the flow graph in a VM. The cloned portion of the flow graph includes a buffer, as described in more detail below. The cloud resource request from the streams manager 360 to the cloud manager 350 may include a parameter that specifies whether the buffer should be at the input or at the output of the cloned portion.

Streams manager 360 also includes a flow graph failure notification mechanism 524. The flow graph failure notification mechanism 524 monitors performance of the flow graph, and when a failure in the first portion of the flow graph for which data loss needs to be prevented is detected, the flow graph failure notification mechanism 524 notifies the cloned portion of the failure. In response, the cloned portion can begin outputting data tuples to the flow graph without any loss of data, as described in more detail below.

Streams manager 360 includes a boundary notification mechanism 526. The boundary notification mechanism 526 provides a periodic signal to both the primary flow graph and to the cloned portion. The period of this periodic signal can be defined in any suitable way. For example, the boundary notification mechanism 526 can provide a signal when a predefined number of data tuples have been processed (e.g., every 100,000 data tuples), at a predetermined time period (e.g., every 10 seconds), or any other time period defined in any suitable way. The times when the boundary notification mechanism provides its notifications are termed herein processing boundaries. The signal from the boundary notification mechanism 526 at the processing boundaries serves two functions. The first function is to flush the buffer in the cloned portion at each processing boundary when there is no failure in the primary flow graph. The second function is to provide a synchronization point to switch from the cloned portion providing data tuples after a failure in the primary flow graph to the primary flow graph resuming its processing once the primary flow graph recovers from the failure in the first portion. Let's assume the streams manager 360 detected a failure in the first portion of the primary flow graph for which data loss needs to be prevented. When the flow graph failure notification mechanism 524 notifies the cloned portion of a failure in the first portion of the primary flow graph, the cloned portion outputs its data tuples to the primary flow graph in a way that avoids data loss due to the buffer. However, the first portion of the primary flow graph may recover from its failure and become operational again. At this point, the streams manager 360 notifies the cloned portion and the primary flow graph to switch at a predetermined point in the future defined by a processing boundary as defined by the signal from the boundary notification mechanism 526. The boundary notification mechanism 526 thus provides a synchronization signal at a predefined processing boundary that allows switching processing from the cloned portion back to the primary flow graph.

The buffer in the cloned portion of the flow graph can be at the input of the cloned portion or at the output of the cloned portion. A first example is provided in FIGS. 6-9 for the buffer at the input of the cloned portion. A second example is provided in FIGS. 10-12 for the buffer at the output of the cloned portion. Each offers different advantages and disadvantages. When the buffer is at the input of the cloned portion, none of the cloned operators process any data until a failure occurs. This means cloud resources do not have to be used to process the data until there is a failure. A disadvantage of having the buffer at the input of the cloned portion is that upon a failure, there will be a delay while the buffered data is processed by the operators in the cloned portion. Another disadvantage is that in certain stateful operator scenarios, such as sliding windows, having a buffer at the input of the cloned portion cannot be used because it will not produce the same results as the primary graph without processing all the data, without orchestrating numerous state notifications between the primary and cloned flow graphs. When the buffer is at the output of the cloned portion, all of the cloned operators are constantly processing data, even when no failure in the primary flow graph occurs. This means cloud resources are being used to process the data, even when there is no failure. The advantages to having a buffer at the output of the cloned portion is that upon a failure, there is minimal delay in getting the replacement results because the cloned flow graph has been continuously processing the data. In addition, having a buffer at the output of the cloned portion can be used for portions of a flow graph that contain stateful operators.

Figure 6:
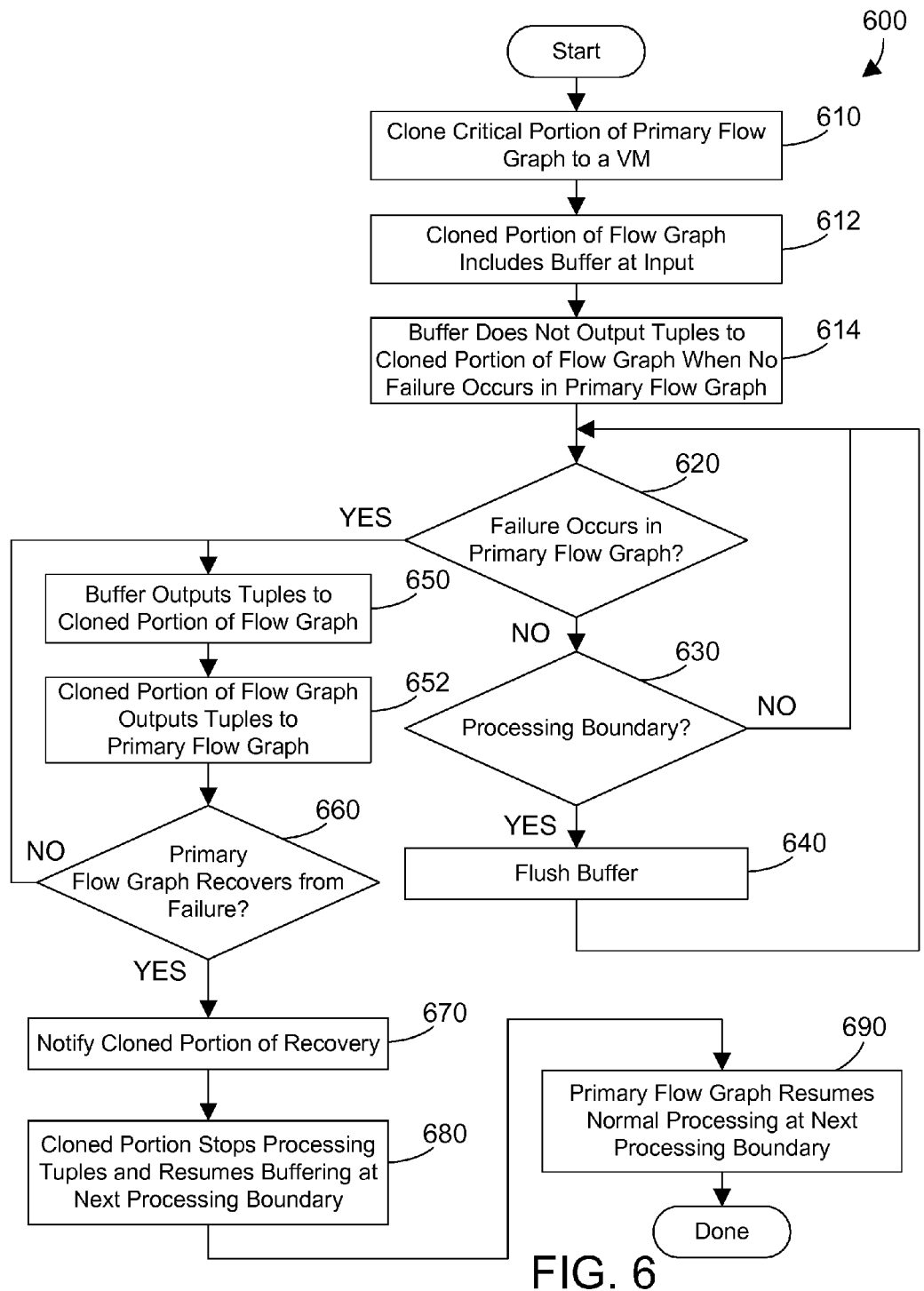
FIG. 6 is a flow diagram of a first method for a streams manager to clone a portion of a primary flow graph with a buffer.

FIG. 6 shows one suitable example of a method 600 for managing a streaming application by cloning a portion of the flow graph with a buffer at the input of the cloned portion. Method 600 begins assuming a critical portion of a primary flow graph has been identified. The term "critical portion" used herein means a portion of the primary flow graph for which data loss is unacceptable. The critical portion of the primary flow graph is cloned to a VM (step 610). The cloning is preferably performed by the buffered clone mechanism 522 shown in FIG. 5. For this specific example, the cloned portion includes a buffer at the input (step 612). The buffer does not output data tuples to the operators in the cloned portion of the flow graph when no failure occurs in the primary flow graph (step 614). When no failure occurs in the primary flow graph (step 620=NO), and the next processing boundary has not been reached (step 630=NO), method 600 loops back to step 620 and continues. When no failure occurs in the primary flow graph (step 620=NO) and a processing boundary is reached (step 630=YES), the buffer in the cloned portion is flushed (step 640), and method 600 loops back to step 620. The cloned portion knows the processing boundary is reached when it receives a notification from the boundary notification mechanism 526 shown in FIG. 5. Note that a buffer as shown as described herein may include multiple separate buffers so a first buffer can be flushed while a second buffer can be receiving data while the first buffer is being flushed.

When a failure occurs in the critical portion of the primary flow graph (step 620=YES), the buffer outputs data tuples to the operators in the cloned portion of the flow graph (step 650). Note the cloned portion knows the failure occurred because it received a notification from the flow graph failure notification mechanism 524 shown in FIG. 5. The cloned portion then outputs its data tuples to the primary flow graph (step 652). As long as the primary flow graph does not recover from the failure (step 660=NO), method 600 loops back to step 650, and processing of data tuples by the cloned portion continues. When the primary flow graph recovers from the failure (step 660=YES), the cloned portion is notified of the recovery (step 670). The cloned portion then stops processing data tuples and resumes buffering at the next processing boundary (step 680). The primary flow graph resumes normal processing at the next processing boundary (step 690). The processing boundary thus becomes a synchronization point for handing off the processing of data tuples from the cloned portion back to the primary flow graph once the failure in the primary flow graph is resolved.

Figure 7:
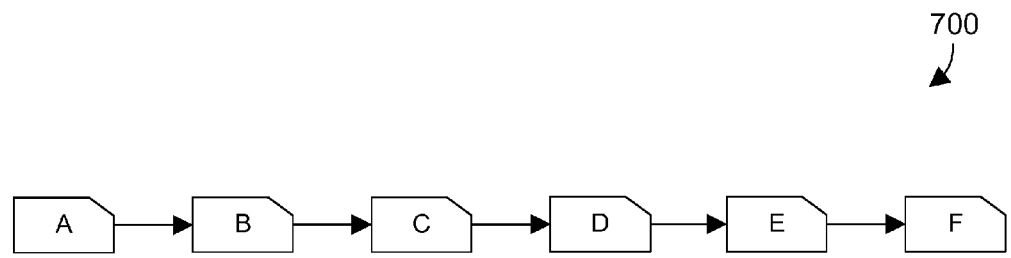
FIG. 7 is a flow graph of one specific example of a streaming application.
Figure 8:
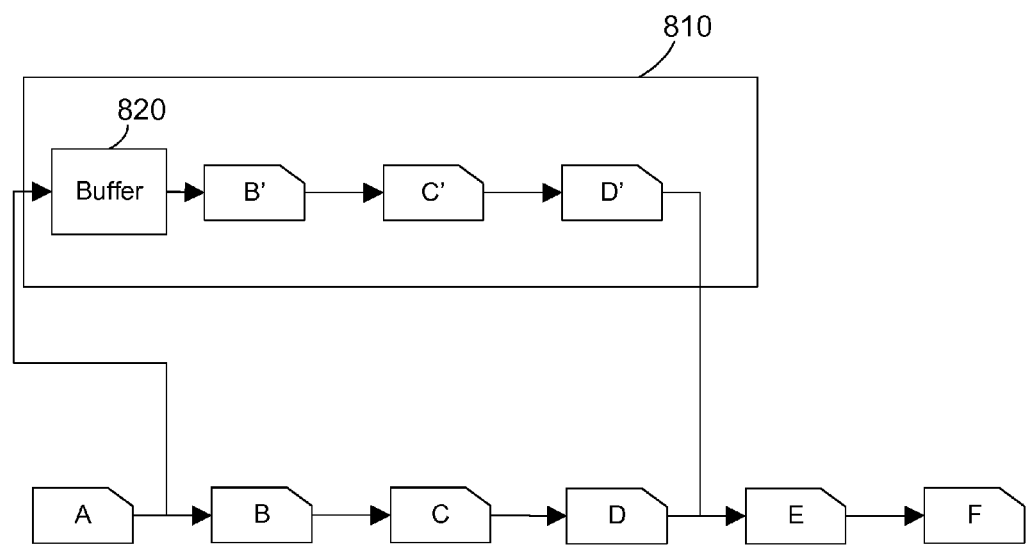
FIG. 8 is a flow graph showing cloning of a portion of the flow graph in FIG. 7 with a buffer on the input.
Figure 9:
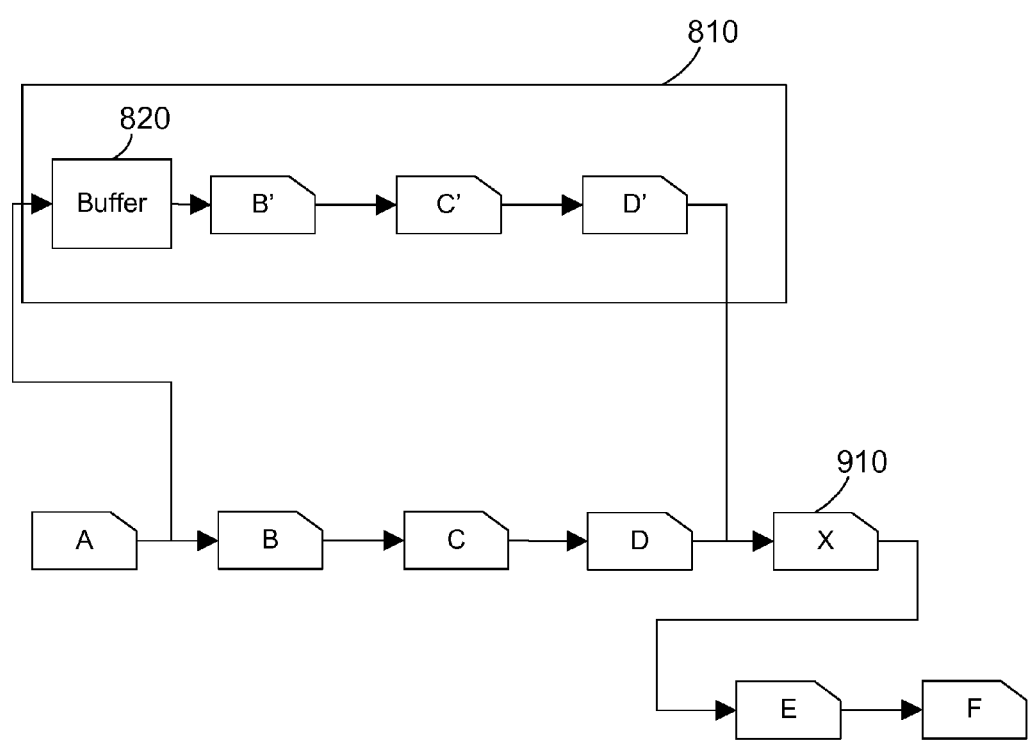
FIG. 9 is a flow graph showing cloning of a portion of the flow graph in FIG. 7 with a buffer on the input and with a deduplication operator added to the primary flow graph.

A simple example is now presented in FIGS. 7-9 for a flow graph and cloned portion described in FIG. 6. The simple flow graph 700 shown in FIG. 7 includes an operator A that outputs its data tuples to an operator B, which outputs its data tuples to an operator C, which outputs its data tuples to an operator D, which outputs its data tuples to an operator E, which outputs its data tuples to an operator F. The flow graph 700 is one suitable example of a primary flow graph. Note the example in FIG. 7 is extremely simplified for the purpose of illustration. Flow graphs can contain hundreds and even thousands of operators, and may have many inputs and many outputs.

We assume for this example that operators B, C and D are identified as critical operators, meaning data loss in any of these operators needs to be prevented. In response, the cloned portion 810 in FIG. 8 is created in a virtual machine, with a buffer 820 at the input of the cloned portion. The cloned portion 810 also includes operators B', C' and D', which implement the same functions as operators B, C and D in the primary flow graph. In one specific implementation, operators B', C' and D' are copies of operators B, C and D, respectively, in the primary flow graph. Operator D' in the cloned portion 810 sends its data tuples to operator E in the primary flow graph, as shown in FIG. 8. With the buffer 820 at the input of the cloned portion 810, when there is no failure in the primary flow graph, the buffer 820 constantly receives data tuples from operator A, but none of operators B', C' or D' are processing data tuples because the buffer 820 does not output any data tuples to operator B' until a failure occurs in operators B, C or D of the primary flow graph. When a failure occurs in operators B, C or D of the primary flow graph, the cloned portion 810 is notified of the failure, and in response, the buffer 820 begins outputting its buffered data tuples from operator A to operator B', which processes the data tuples from buffer 820 and outputs its data tuples to operator C', which processes the data tuples from operator B' and outputs its data tuples to operator D', which processes the data tuples from operator C' and outputs its data tuples to operator E in the primary flow graph. The buffer 820 preferably has a size sufficient to assure that any failure in operators B, C or D in the primary flow graph will not cause data loss due to the buffered data tuples from operator A stored in buffer 820 that will be processed by operators B', C' and D'.

In some scenarios, operator E may not care if it receives duplicate data tuples from both operator D and operator D'. As shown in FIG. 8, operator E does not care whether it receives duplicate data tuples from both operator D and operator D'. In other scenarios, if operator E cannot handle receiving duplicate data tuples from operator D' that it has already received from operator D, a deduplication operator X may be added in the primary flow graph at the time the cloned portion is created, as shown at 910 in FIG. 9. Data tuples from both operator D and operator D' are processed by the deduplication operator X 910, which then assures the duplicate data tuples are not passed through to the input of operator E.

Figure 10:
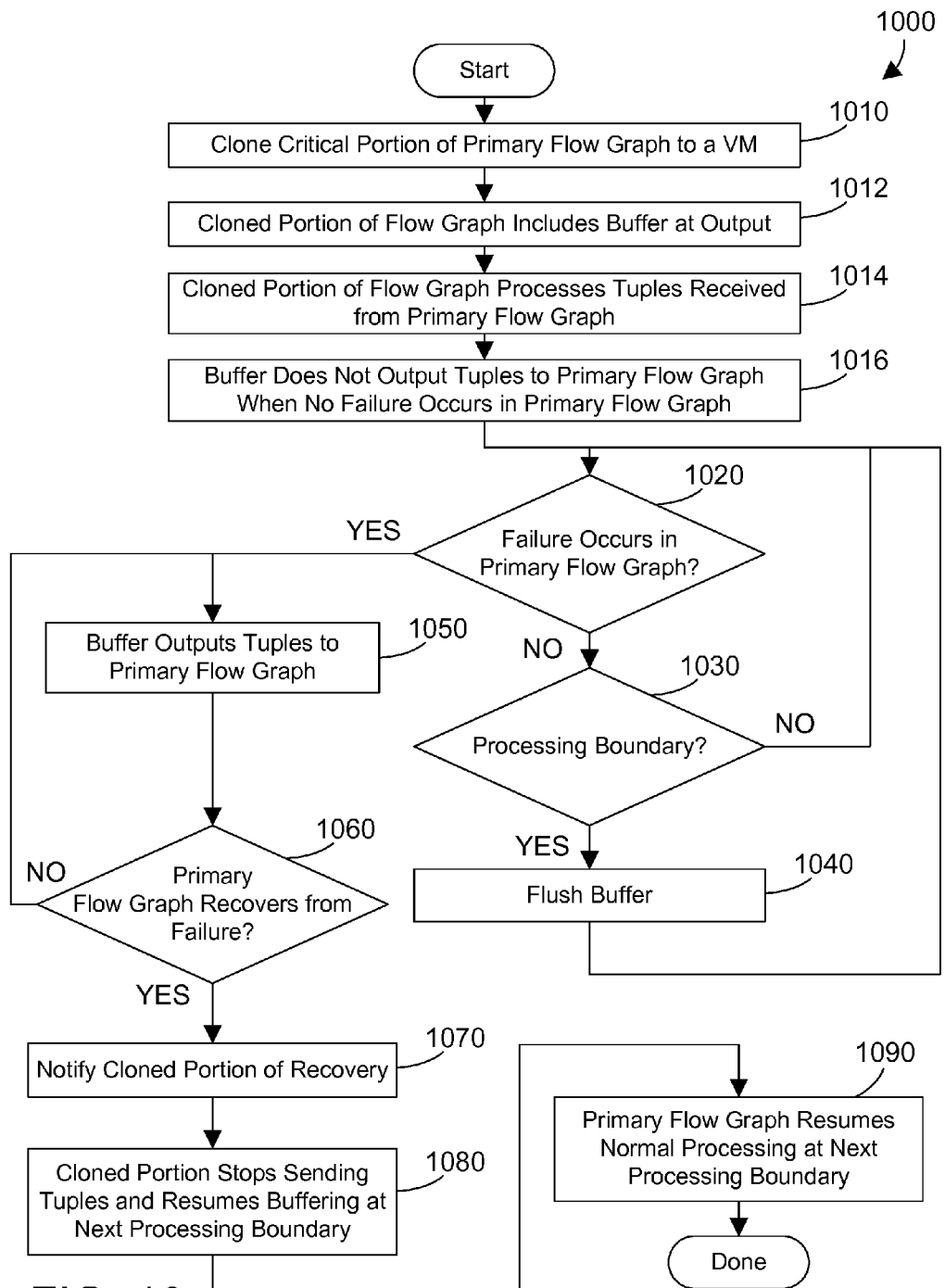
FIG. 10 is a flow diagram of a second method for a streams manager to clone a portion of a primary flow graph with a buffer.
Figure 11:
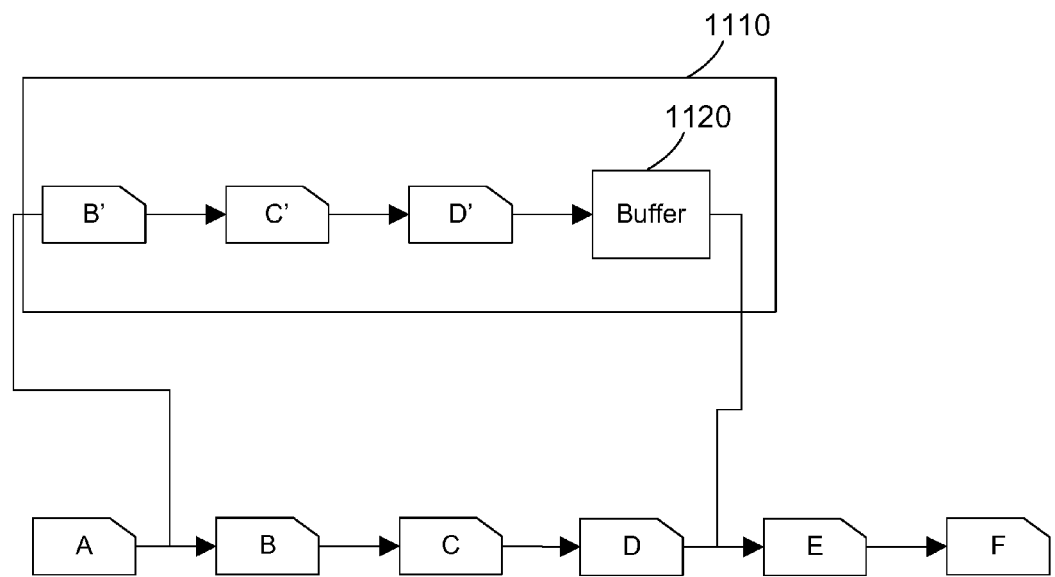
FIG. 11 is a flow graph showing cloning of a portion of the flow graph in FIG. 7 with a buffer on the output.
Figure 12:
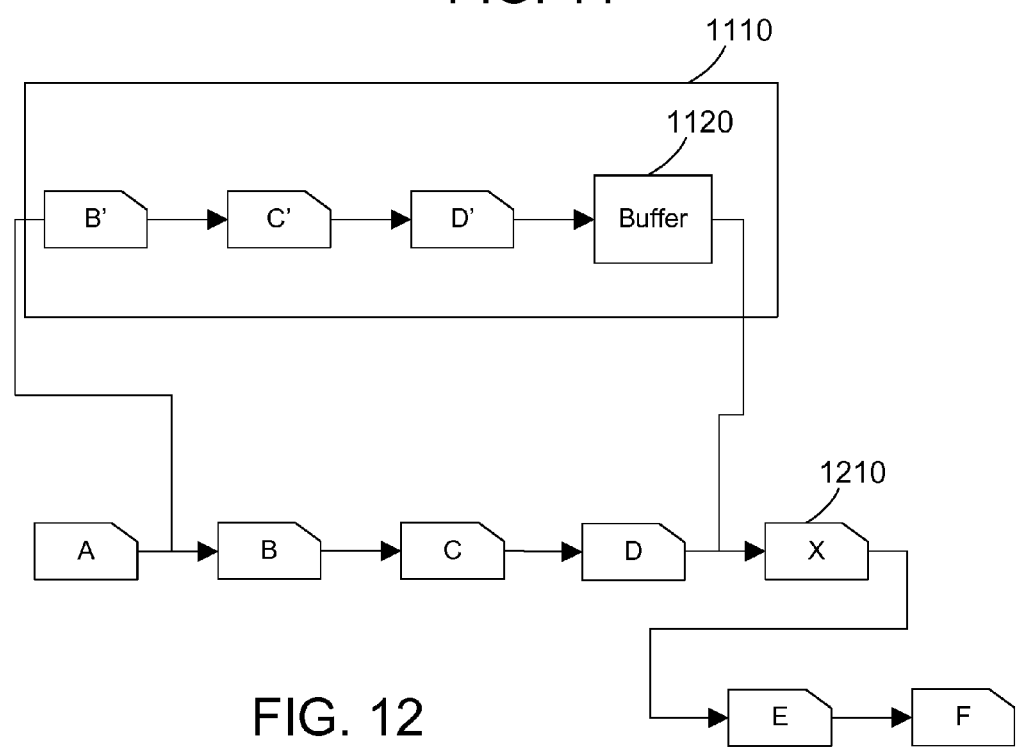
FIG. 12 is a flow graph showing cloning of a portion of the flow graph in FIG. 7 with a buffer on the output and with a deduplication operator added to the primary flow graph.

A second example is shown in FIGS. 10-12 when a buffer is added at the output of the cloned portion. Referring to FIG. 10, we assume as a starting point a critical portion of the primary flow graph is identified for which data loss needs to be prevented. The critical portion of the primary flow graph is cloned to a virtual machine (step 1010). The cloned portion includes a buffer at its output (step 1012). The operators in the cloned portion process data tuples received from the primary flow graph (step 1014). The buffer does not output data tuples to the primary flow graph when no failure occurs in the primary flow graph (step 1016). When there is no failure in the critical portion of the primary flow graph (step 1020=NO), and the next processing boundary has not been reached (step 1030=NO), method 1000 loops back to step 1020 and continues. When there is no failure in the primary flow graph (step 1020=NO) and the next processing boundary is reached (step 1030=YES), the buffer is flushed (step 1040), and method 1000 loops back to step 1020 and continues. When a failure occurs in the critical portion of the primary flow graph (step 1020=YES), the buffer outputs its stored data tuples to the primary flow graph (step 1050). As long as the primary flow graph has not recovered from the failure (step 1060=NO), method 1000 loops back to step 1050 and the cloned portion continues processing. When the primary flow graph recovers from the failure (step 1060=YES), the cloned portion is notified of the recovery (step 1070). In response, the cloned portion stops sending data tuples and resumes buffering at the next processing boundary (step 1080), and the primary flow graph resumes normal processing at the next processing boundary (step 1090).

We assume for this example the same original primary flow graph 700 shown in FIG. 7, and that operators B, C and D are identified as operators for which data loss needs to be prevented. In response, the cloned portion 1110 is created in a virtual machine, as shown in FIG. 11. The cloned portion includes operators B', C' and D', similar to those discussed above with respect to FIG. 8. A buffer 1120 is placed at the output of the cloned portion 1110. The buffer 1120 thus constantly receives data tuples from operator D', but does not output any of those data tuples as long as there is no failure in any of operators B, C and D in the primary flow graph. When a failure in any of operators B, C or D in the primary flow graph is detected, the cloned portion 1110 is notified, which causes the buffer 1120 to begin outputting its stored data tuples from operator D' to operator E in the primary flow graph. When the primary flow graph recovers from the failure, the cloned portion 1110 is notified, and at the next processing boundary the buffer 1120 in the cloned portion stops sending its data tuples to operator E, and the primary flow graph resumes normal processing. The configuration shown in FIG. 11 assumes operator E is tolerant to receiving duplicate data tuples from buffer 1120 and from operator D. If operator E cannot receive duplicate data tuples from these two sources, a deduplication operator X 1210 shown in FIG. 12 can be added to remove any duplicate data tuples received from the buffer 1120 and operator D, thereby assuring operator E does not see any duplicate data tuples.

In the specific examples shown in the figures, a buffer separate from the operators is shown. However, an alternative implementation is to create an operator that includes an internal buffer. Thus, buffer 820 in FIGS. 8 and 9 could be implemented within operator B', making a separate buffer unnecessary. Similarly, buffer 1120 in FIGS. 11 and 12 could be implemented within operator D', making a separate buffer unnecessary. The disclosure and claims herein extend to cloning a portion of the primary flow graph with a buffer, regardless of how or where the buffer is implemented.

The very simplified examples discussed herein show a primary flow graph and a cloned portion that each have only one input and one output. In reality, a primary flow graph and a cloned portion can both have multiple inputs and outputs. In the case of multiple inputs in a cloned portion that has buffers at the inputs, a buffer will be needed at each input of the cloned portion. Similarly, in the case of multiple outputs in a cloned portion that has buffers at the outputs, a buffer will be needed at each output of the cloned portion. Scaling the simple example shown in the figures and discussed in detail above to a more complicated example that includes multiple inputs and/or multiple outputs in the cloned portion will be evident to one of ordinary skill in the art based on the disclosure herein.

The disclosure and claims herein relate to a streams manager that clones a portion of a primary flow graph to a virtual machine with a buffer to assure no data is lost if the corresponding portion of the primary flow graph fails. The buffer can be on the input of the cloned portion or on the output of the cloned portion. Cloning a portion of a primary flow graph with a buffer assures no data is lost when the corresponding portion of the primary flow graph fails. When the primary flow graph recovers from the failure, the processing may be switched back to the primary flow graph, which causes the buffer to begin buffering once again.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    at least one processor;
    a memory coupled to the at least one processor;
    a streaming application residing in the memory and executed by the at least one processor, the streaming application comprising a primary flow graph that includes a plurality of operators that process a plurality of data tuples, wherein the primary flow graph comprises a first portion for which data loss needs to be prevented; and
    a streams manager residing in the memory and executed by the at least one processor, the streams manager cloning the first portion of the primary flow graph to a virtual machine, wherein the cloned first portion comprises a buffer that stores data tuples for the cloned first portion, the streams manager detecting when the first portion of the primary flow graph has a failure, and in response to detecting the failure, notifies the cloned first portion of the failure in the first portion of the primary flow graph, and in response, the cloned first portion outputs data tuples to the primary flow graph to avoid data loss by the first portion of the primary flow graph that had the failure.

2. The apparatus of claim 1 wherein the streams manager detects when the first portion of the primary flow graph recovers from the failure, notifies the cloned first portion of the recovery from the failure, and in response, at a predetermined time, the cloned first portion stops outputting data tuples to the primary flow graph and the first portion of the primary flow graph resumes processing.

3. The apparatus of claim 1 wherein the streams manager further comprises a processing boundary notification mechanism that provides a signal that indicates a processing boundary to the primary flow graph and to the cloned first portion at the predetermined time.

4. The apparatus of claim 3 wherein the cloned portion flushes the buffer when the signal that indicates the processing boundary is received and when the first portion of the primary flow graph has no failure.

5. The apparatus of claim 1 wherein the buffer is on an input to the cloned first portion and does not output any data tuples to the cloned first portion until the streams manager notifies the buffer of the failure in the first portion of the primary flow graph.

6. The apparatus of claim 5 wherein no operators in the cloned first portion process any data tuples until the streams manager notifies the buffer of the failure in the first portion of the primary flow graph.

7. The apparatus of claim 1 wherein the buffer is on an output of the cloned first portion and does not output any data tuples from the cloned first portion to the primary flow graph until the streams manager notifies the buffer of the failure in the first portion of the primary flow graph.

8. The apparatus of claim 7 wherein operators in the cloned first portion process data tuples in parallel with the first portion of the primary flow graph and the output of the cloned first portion is stored in the buffer.

9. The apparatus of claim 1 wherein the streams manager creates a deduplication operator in the primary flow graph that receives data tuples from the primary flow graph and from the cloned first portion and assures no duplicate data tuples received from the primary flow graph and from the cloned first portion are sent to a subsequent operator in the primary flow graph.

* * * * *